(12) United States Patent
Asher et al.

(10) Patent No.: US 12,072,910 B2
(45) Date of Patent: Aug. 27, 2024

(54) ASYNCHRONOUS REMOTE REPLICATION DATA DEDUPLICATION LAYER

(71) Applicant: Dell Products L.P., Round Rock, TX (US)

(72) Inventors: Mohammed Asher, Bangalore (IN); Ramesh Doddaiah, Westborough, MA (US); Mark Hakstead, Holliston, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/974,990

(22) Filed: Oct. 27, 2022

(65) Prior Publication Data

US 2024/0143622 A1    May 2, 2024

(51) Int. Cl.
G06F 16/00     (2019.01)
G06F 16/215    (2019.01)
G06F 16/27     (2019.01)

(52) U.S. Cl.
CPC .......... *G06F 16/273* (2019.01); *G06F 16/215* (2019.01)

(58) Field of Classification Search
USPC .......................................... 707/613
See application file for complete search history.

(56) References Cited

U.S. PATENT DOCUMENTS

| | | | |
|---|---|---|---|
| 7,542,986 B2 * | 6/2009 | Lubbers | G06F 11/2064 707/999.102 |
| 7,542,987 B2 * | 6/2009 | Lubbers | G06F 11/2069 707/999.102 |
| 11,513,684 B1 * | 11/2022 | Tylik | G06F 3/0644 |
| 2021/0286768 A1 * | 9/2021 | Kucherov | G06F 12/0811 |
| 2022/0012218 A1 * | 1/2022 | Wu | G06F 16/2255 |
| 2022/0067060 A1 * | 3/2022 | O'Halloran | G06Q 10/063 |
| 2022/0083564 A1 * | 3/2022 | Bora | G06F 12/0802 |

* cited by examiner

*Primary Examiner* — Bai D Vu
(74) *Attorney, Agent, or Firm* — Krishnendu Gupta; Nikhil Patel (57) ABSTRACT

The present disclosure relates to applying a data deduplication layer on top of an asynchronous remote replication protocol. In embodiments, a remote replication group including one or more of a storage array's logical unit numbers (LUNs) can be established. Further, at a remote system, —the remote replication group can be remotely replicated on a per LUN basis using a deduplication fingerprint of each LUN's data tracks corresponding to the remote replication group.

20 Claims, 6 Drawing Sheets

ASYNCHRONOUS REMOTE REPLICATION DATA DEDUPLICATION LAYER

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. Further, the CMS can include one or more processors that perform data storage services. For example, the financial institution may want to back up its data on a remote system, e.g., to recover any data losses. Accordingly, the CMS can perform one or more remote data replication services.

SUMMARY

In aspects of the present disclosure, a method includes establishing a remote replication group including one or more of a storage array's logical unit numbers (LUNs) and remotely replicating the remote replication group on a per LUN basis using a deduplication fingerprint of each LUN's data tracks corresponding to the remote replication group.

In embodiments, the method can further include receiving an input/output (IO) workload at a storage array, where the IO workload includes IO requests targeting at least one of the storage array's LUNs, and generating at least one corresponding deduplication fingerprint for each IO request in the IO workload.

In embodiments, the method can further include receiving the IO workload according to a capture cycle, N+m, and generating one or more cycle snaps of at least the remote replication group according to a cycle snap schedule.

In embodiments, the method can further include transmitting data corresponding to the remote replication group according to a transmit cycle, N, to the remote system and replicating LUN data on the remote storage array according to an apply cycle, N−1.

In embodiments, the method can further include generating one or more cycle snaps of at least the remote replication group according to a cycle snap schedule, where the cycle snap schedule corresponds to the transmit cycle, apply cycle, or a statically/dynamically defined cycle.

In embodiments, the method can further include determining whether the remote array or server includes data duplicating the remote replication group's data (dedupe data) during a period corresponding to a replication group cycle snap, where the replication group cycle snap corresponds to a time interval consistent with at least one of the transmit or apply cycles.

In embodiments, the method can further include identifying fingerprint matches by comparing each deduplication fingerprint corresponding to the remote replication group with the remote system's stored duplication fingerprints at a time corresponding to the replication group cycle snap.

In embodiments, the method can further include performing a byte-to-byte comparison for each identified fingerprint match's related storage array data track and remote system data track and establishing a deduplication relationship between the storage array data track and the remote system data track.

In embodiments, the method can further include determining whether each unmatched deduplication's related data track's corresponding remote system data track is in a write-pending (WP) state.

In embodiments, the method can further include destaging each unmatched deduplication's related data track on the remote system based on their corresponding remote system data track's WP state.

In aspects of the present disclosure, a system with a processor and memory, the system configured to establish a remote replication group includes one or more of a storage array's logical unit numbers (LUNs) and remotely replicate the remote replication group on a per LUN basis using a deduplication fingerprint of each LUN's data tracks corresponding to the remote replication group.

In embodiments, the system can be further configured to receive an input/output (IO) workload at a storage array, where the IO workload includes IO requests targeting at least one of the storage array's LUNs, and generate at least one corresponding deduplication fingerprint for each IO request in the IO workload.

In embodiments, the system can be further configured to receive the IO workload according to a capture cycle, N+m, and generate one or more cycle snaps of at least the remote replication group according to a cycle snap schedule.

In embodiments, the system can be further configured to transmit data corresponding to the remote replication group according to a transmit cycle, N, to the remote system and replicate LUN data on the remote storage array according to an apply cycle, N−1.

In embodiments, the system can be further configured to generate one or more cycle snaps of at least the remote replication group according to a cycle snap schedule, where the cycle snap schedule corresponds to the transmit cycle, apply cycle, or a statically/dynamically defined cycle.

In embodiments, the system can be further configured to determine whether the remote array or server includes data duplicating the remote replication group's data (dedupe data) during a period corresponding to a replication group cycle snap, where the replication group cycle snap corresponds to a time interval consistent with at least one of the transmit or apply cycles.

In embodiments, the system can be further configured to identify fingerprint matches by comparing each deduplication fingerprint corresponding to the remote replication group with the remote system's stored duplication fingerprints at a time corresponding to the replication group cycle snap.

In embodiments, the system can be further configured to perform a byte-to-byte comparison for each identified fingerprint match's related storage array and remote system data tracks and establish a deduplication relationship between the storage array data track and the remote system data track.

In embodiments, the system can be further configured to determine whether each unmatched deduplication's related data track's corresponding remote system data track is in a write-pending (WP) state.

In embodiments, the system can be further configured to destage each unmatched deduplication's related data track on the remote system based on their corresponding remote system data track's WP state.

Other technical features are readily apparent to one skilled in the art from the following figures, descriptions, and claims.

BRIEF DESCRIPTION OF THE DRAWINGS

The preceding and other objects, features, and advantages will be apparent from the following more particular description of the embodiments, as of the accompanying drawings. Like reference, characters refer to the same parts throughout the different views. The drawings are not necessarily to scale, emphasis instead being placed upon illustrating the embodiments' principles.

DETAILED DESCRIPTION

A business like a financial or technology corporation can produce large amounts of data and require sharing access to that data among several employees. These companies often use storage arrays to store and manage the data. Because a business can configure a storage array with multiple storage devices (e.g., hard-disk drives (HDDs) or solid-state drives (SSDs)), a company can scale (e.g., increase or decrease) and manage an array's storage capacity more efficiently compared to a server. In addition, a company can use a storage array to read/write data required by one or more business applications.

In addition, a business can back up its data to a remote system, e.g., as part of a disaster recovery plan or data protection solution. Specifically, a business can use remote replication techniques that back up important data onto remote or secondary storage systems in case problems arise with its primary storage array. For example, problems can include disasters, malfunctions, or attacks on the system that result in data loss. Unfortunately, current naïve remote replication techniques require expensive bandwidth (e.g., inefficiently consuming network bandwidth). Specifically, the naïve techniques often unnecessarily replicate duplicate data.

Thus, embodiments of the present disclosure apply a deduplication layer on remote replication protocols such as an asynchronous remote data facility (RDF/A) protocol. Further, the embodiments can reduce network bandwidth consumption using the deduplication layer applied to RDF/A. For instance, the data deduplication layer eliminates redundant data copies and reduces storage overhead of, e.g., remote data replication systems. Specifically, the data deduplication layer establishes a remote storage group that identifies virtual storage devices using logical unit numbers (LUNs). Accordingly, the data deduplication layer removes duplicate data at a LUN level.

For example, a typical email system corresponding to a specific LUN might contain 100 instances of the same 1-megabyte (MB) file attachment. Current naïve remote replication techniques back up or archive the email results in all 100 instances being remotely saved, thus, requiring 100 MB of storage space. In contrast, the disclosed data deduplication layer ensures that only one instance of the attachment is stored, and each subsequent instance is referenced back to a single instance. Accordingly, the data duplication layer saves 99 MB of network bandwidth consumption and storage capacity.

Figure 1:
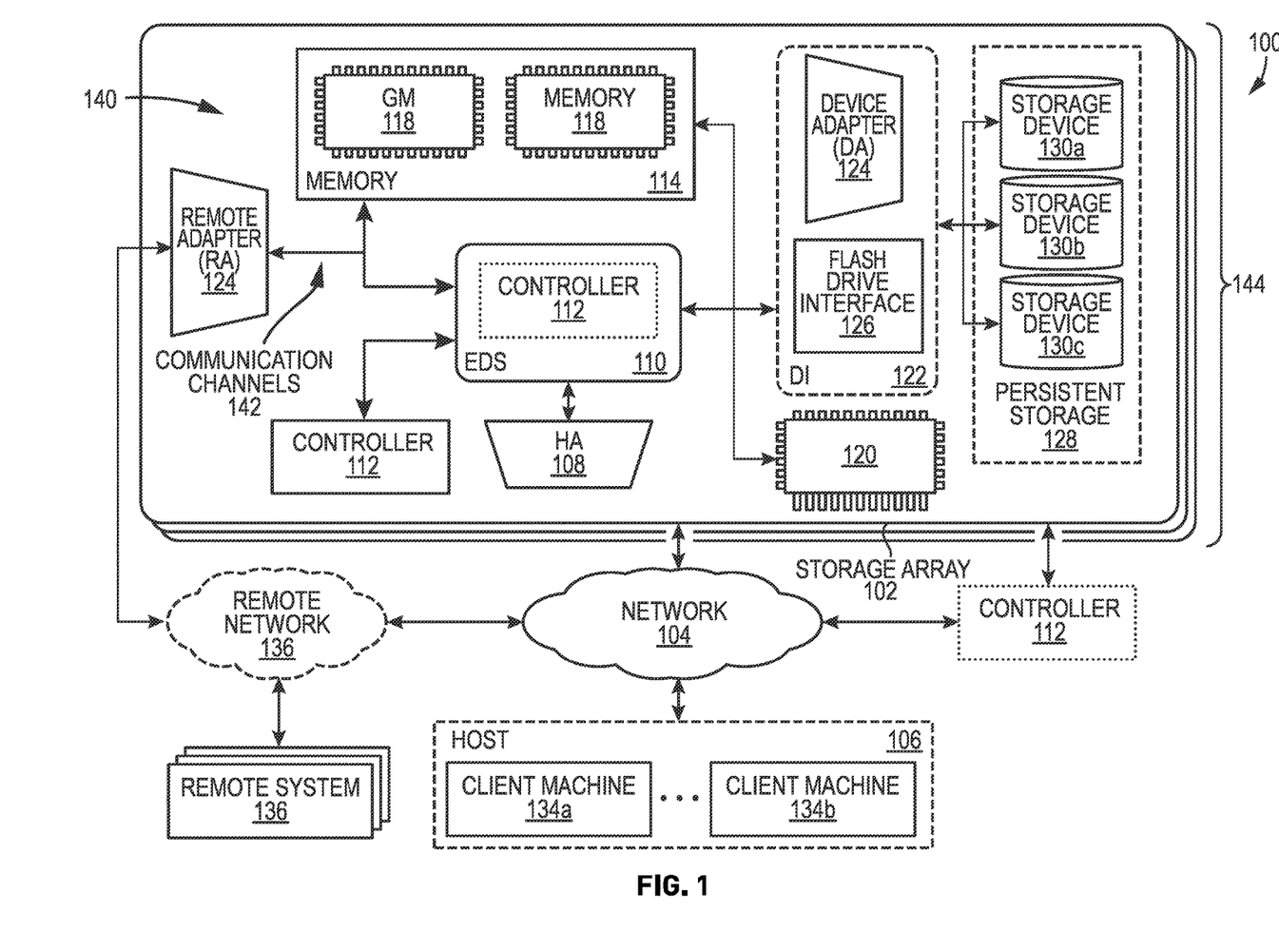
FIG. 1 illustrates a distributed network environment in accordance with embodiments of the present disclosure.

Regarding FIG. 1, a distributed network environment 100 can include a storage array 102, a remote system 138, and hosts 106. In embodiments, the storage array 102 can include components 140 that perform one or more distributed file storage services. In addition, the storage array 102 can include one or more internal communication channels 142 like Fibre channels, busses, and communication modules that communicatively couple the components 140.

In embodiments, the storage array 102, components 140, and remote system 138 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 138, and hosts 106 can virtualize one or more of their respective physical computing resources (e.g., processors (not shown), memory 114, and persistent storage 128).

In embodiments, the storage array 102 and, e.g., one or more hosts 106 (e.g., networked devices) can establish a network 104. Similarly, the storage array 102 and a remote system 138 can establish a remote network 136. Further, the network 104 or the remote network 136 can have a network architecture that enables networked devices to send/receive electronic communications using a communications protocol. For example, the network architecture can define a storage area network (SAN), local area network (LAN), wide area network (WAN) (e.g., the Internet), and Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 104 or remote network 136 using one or more network interfaces. The network interface can include a wired/wireless connection interface, bus, data link, and the like. For example, a host adapter (HA 108), e.g., a Fibre Channel Adapter (FA) and the like, can connect the storage array 102 to the network 104 (e.g., SAN). Further, the HA 108 can receive and direct IOs to one or more of the storage array's components 140, as described in greater detail herein.

Likewise, a remote adapter (RA 132) can connect the storage array 102 to the remote network 136. Further, the network 104 and remote network 136 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 104 or remote network 136 can include a network bridge that enables cross-network communications between, e.g., the network 104 and remote network 136.

In embodiments, hosts 106 connected to the network 104 can include client machines 134*a-b*, running one or more applications. The applications can require one or more of the storage array's services. Accordingly, each application can send one or more input/output (IO) messages (e.g., a read/write request or other storage service-related request) to the storage array 102 over the network 104. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 116) that can cache IO messages and their respective data payloads. Additionally, the memory 114 can include local memory (LM 118) that stores instructions that the storage array's processor(s) can execute to perform one or more storage-related services. In addition, the storage array 102 can deliver its distributed storage services using persistent storage 128. For example, the persistent storage 128 can include multiple thin-data devices (TDATs) such as persistent storage drives 130*a-c*. Further, each TDAT can have distinct performance capabilities (e.g., read/write speeds) like hard disk drives (HDDs) and solid-state drives (SSDs).

Further, the HA 108 can direct one or more IOs to an array component 140 based on their respective request types and metadata. In embodiments, the storage array 102 can include a device interface (DI 122) that manages access to the array's persistent storage 128. For example, the DI 122 can include a device adapter (DA 124) (e.g., storage device controller), flash drive interface 126, and the like that controls access to the array's persistent storage 128 (e.g., storage devices 130*a-c*).

Likewise, the storage array 102 can include an Enginuity Data Services processor (EDS 110) that can manage access to the array's memory 114. Further, the EDS 110 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 128. For example, the EDS 110 can deliver hosts 106 (e.g., client machines 134*a-b*) remote/distributed storage services by virtualizing the storage array's memory/storage resources (memory 114 and persistent storage 128, respectively).

In embodiments, the storage array 102 can also include a controller 112 (e.g., management system controller) that can reside externally from or within the storage array 102 and one or more of its components 140. When external from the storage array 102, the controller 112 can communicate with the storage array 102 using any known communication connections. The communications connections can include a serial port, parallel port, network interface card (e.g., Ethernet), etc. Further, the controller 112 can include logic/circuitry that performs one or more storage-related services. For example, the controller 112 can have an architecture designed to manage the storage array's computing, storage, and memory resources as described in greater detail herein.

Figure 2:
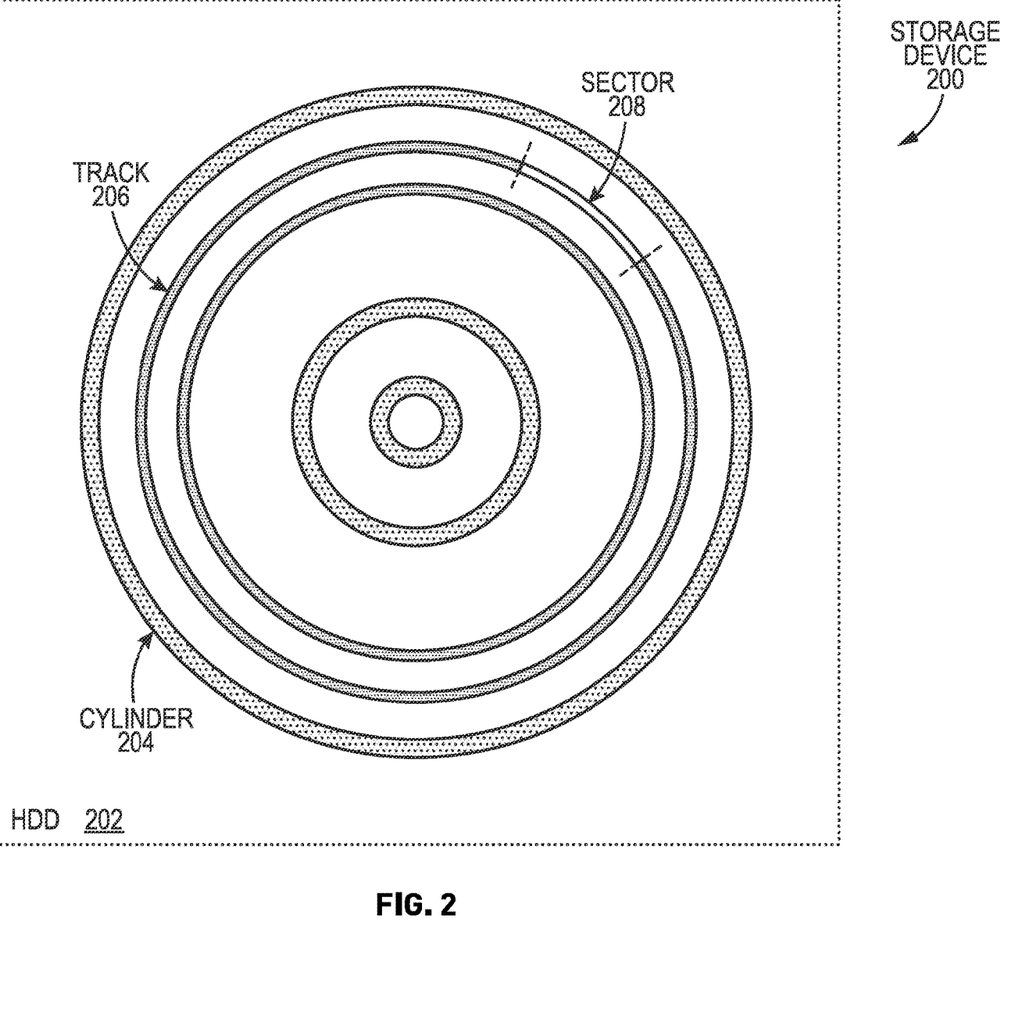
FIG. 2 is a cross-sectional view of a storage device in accordance with embodiments of the present disclosure.

Regarding FIG. 2, the storage array's EDS 110 can virtualize the array's persistent storage 128. Specifically, the EDS 110 can virtualize a storage device 200, which is substantially like one or more of the storage devices 130*a-130c*. For example, the EDS 110 can provide a host, e.g., client machine 134*a*, with a virtual storage device (e.g., thin-device (TDEV)) that logically represents one or more of the storage array's physical storage resources or slices/portions thereof (e.g., extents). Further, the EDS 110 can provide each TDEV with a unique identifier (ID) like a target ID (TID). Additionally, EDS 110 can map each TID to its corresponding TDEV using a logical unit number (LUN) (e.g., a pointer to the TDEV). The EDS 110 can also generate a searchable data structure, mapping logical storage representations to their corresponding physical address spaces. Thus, EDS 100 can enable the HA 108 to present the hosts 106 with the logical storage representations based on host or application performance requirements.

For example, the persistent storage 128 can include an HDD 202 with stacks of cylinders 204. Like a vinyl record's grooves, each cylinder 204 can include one or more tracks 206. Each track 206 can include continuous sets of physical address spaces representing each of its sectors 208 (e.g., slices or portions thereof). The EDS 110 can provide each slice/portion with a corresponding logical block address (LBA). Additionally, the EDS 110 can group sets of continuous LBAs to establish one or more extents. Further, the EDS 110 can group a set of extents to establish a virtual storage device (e.g., TDEV). Thus, each TDEV can include extents and LBAs corresponding to one or more of the persistent storage 128 or portions thereof (e.g., tracks and address spaces).

As stated herein, the persistent storage 128 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 110 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102 can allocate the array's memory/storage resources based on an IO workload's anticipated volume of IO messages associated with each SL tier and the memory hierarchy.

For example, the EDS 110 can establish the hierarchy to include one or more tiers (e.g., subsets of the array's storage and memory) with similar performance capabilities (e.g., response times and uptimes). Thus, the EDS 110 can establish fast memory and storage tiers to service host-identified critical and valuable data (e.g., Platinum, Diamond, and Gold SLs). In contrast, slow memory and storage tiers can service host-identified non-critical and less valuable data (e.g., Silver and Bronze SLs). Additionally, the EDS 110 can define "fast" and "slow" performance metrics based on relative performance measurements of the array's memory 114 and persistent storage 128. Thus, the fast tiers can include memory 114 and persistent storage 128, with relative performance capabilities exceeding a first threshold. In contrast, slower tiers can include memory 114 and persistent storage 128, with relative performance capabilities falling below a second threshold. In embodiments, the first and second thresholds can correspond to the same threshold.

Figure 3:
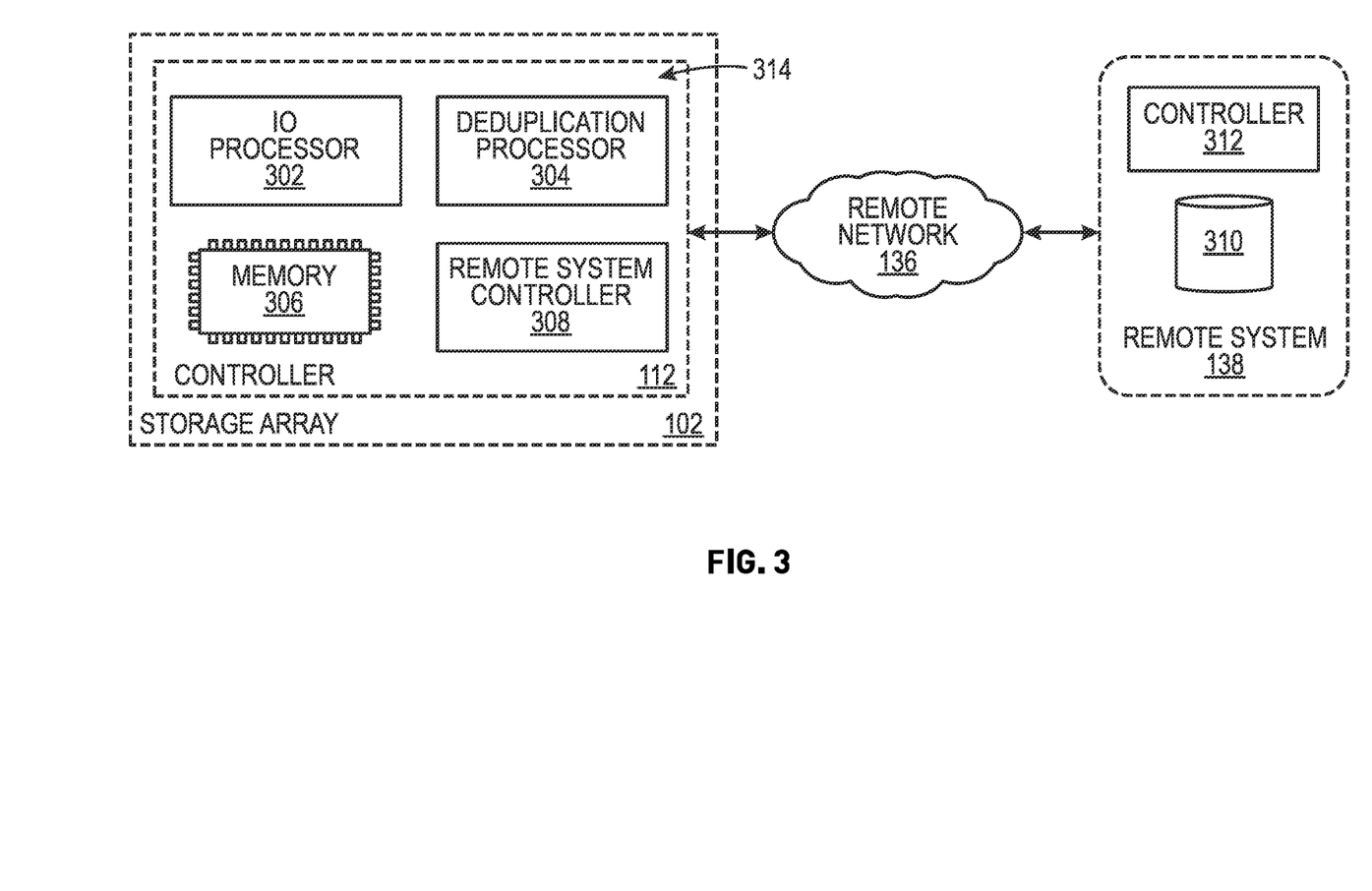
FIG. 3 is a block diagram of a controller in accordance with embodiments of the present disclosure.

Regarding FIG. 3, a storage array 102 can include a controller 112 with one or more hardware, circuitry, and logical elements 314 that perform one or more remote replication services as described in greater detail below.

In embodiments, the controller 112 can include an IO processor 302 that can establish a remote replication group (RG) to identify data requiring remote replication. For instance, the EDS 110, as described above, establishes one or more TDEVs using an SLA. Further, the EDS 110 can maintain a searchable mapping data structure in the controller's memory 306 that associates each TDEV (and corresponding LUN) to its corresponding physical storage locations. In addition, the EDS 110 identifies the SL hierarchy of each TDEV. Accordingly, the IO processor 302 can establish the remote replication group based on each LUN's corresponding SL hierarchy, associated host, or application.

Further, the IO processor 302 can establish IO capture cycles to process an IO workload received by the storage array's HA (e.g., HA 108 of FIG. 1). For example, the IO processor 302 can establish temporal windows, defining an interval during which the HA receives a set of the workload's 10 requests. Accordingly, the IO processor 302 can associate each temporal window with a unique capture cycle, defined as $(\mathbb{N}+\mathbb{m})$, where $\mathbb{N}$ corresponds to an $n^{th}$ transmit cycle and $\mathbb{m}$ corresponds to an $x^{th}$ cycle. In addition, the IO processor 302 can maintain a searchable data structure in the memory 306 that identifies any LUNs targeted by an IO write request during any given capture cycle. In addition, the IO processor 302 can maintain, in the memory 306, a replication group data structure, identifying LUNs targeted by an IO write request during any given capture cycle.

In embodiments, the controller 112 can include an RG deduplication processor 304 that performs LUN-level data deduplication of LUNs corresponding to the remote replication group. Specifically, the RG deduplication processor 304 limits data deduplication to each LUN. Thus, the RG deduplication processor 304 can maintain, in the memory 306, a fingerprint data structure (e.g., hash lookup table) that maps a unique fingerprint of a set of data blocks (e.g., TDEV tracks or portions thereof) to its corresponding data track for each of the RG's LUNs (e.g., LUNs corresponding to the remote replication group). For example, the RG deduplication processor 304 identifies each RG LUN targeted by sequential IO write requests during any given capture cycle. Additionally, the RG deduplication processor 304 generates a unique fingerprint corresponding to a data track of a sequence of IO write requests using, e.g., a hashing technique.

In embodiments, the remote system controller 308 remotely replicates data corresponding to the RG. For example, the remote system controller 308 can perform the remote replication according to a transmit cycle. Specifically, the remote system controller 308, during a transmit cycle N, remotely replicates data corresponding to LUNs having IO write requests received during a capture cycle, $(\mathbb{N}-1)$.

Further, the remote system controller 308, during the capture cycle, $(z,901-1)$, or transmit cycle, $\mathbb{N}$, can identify which of the RG's LUNs were targets of IO write requests.

Additionally, the remote system controller 308 can remotely replicate, during the transmit cycle, $\mathbb{N}$, each identified LUN's tracks changed during the capture cycle, $(\mathbb{N}-1)$, as described in greater detail by FIG. 5 below. Further, the remote system controller 308 can enable a replication controller 312 of a remote system 138 to commit replication data during an apply cycle, $(\mathbb{N}-1)$ transmitted during a transmit cycle, $(\mathbb{N}-2)$, as described in greater detail by the description of FIG. 6 below.

Figure 4:
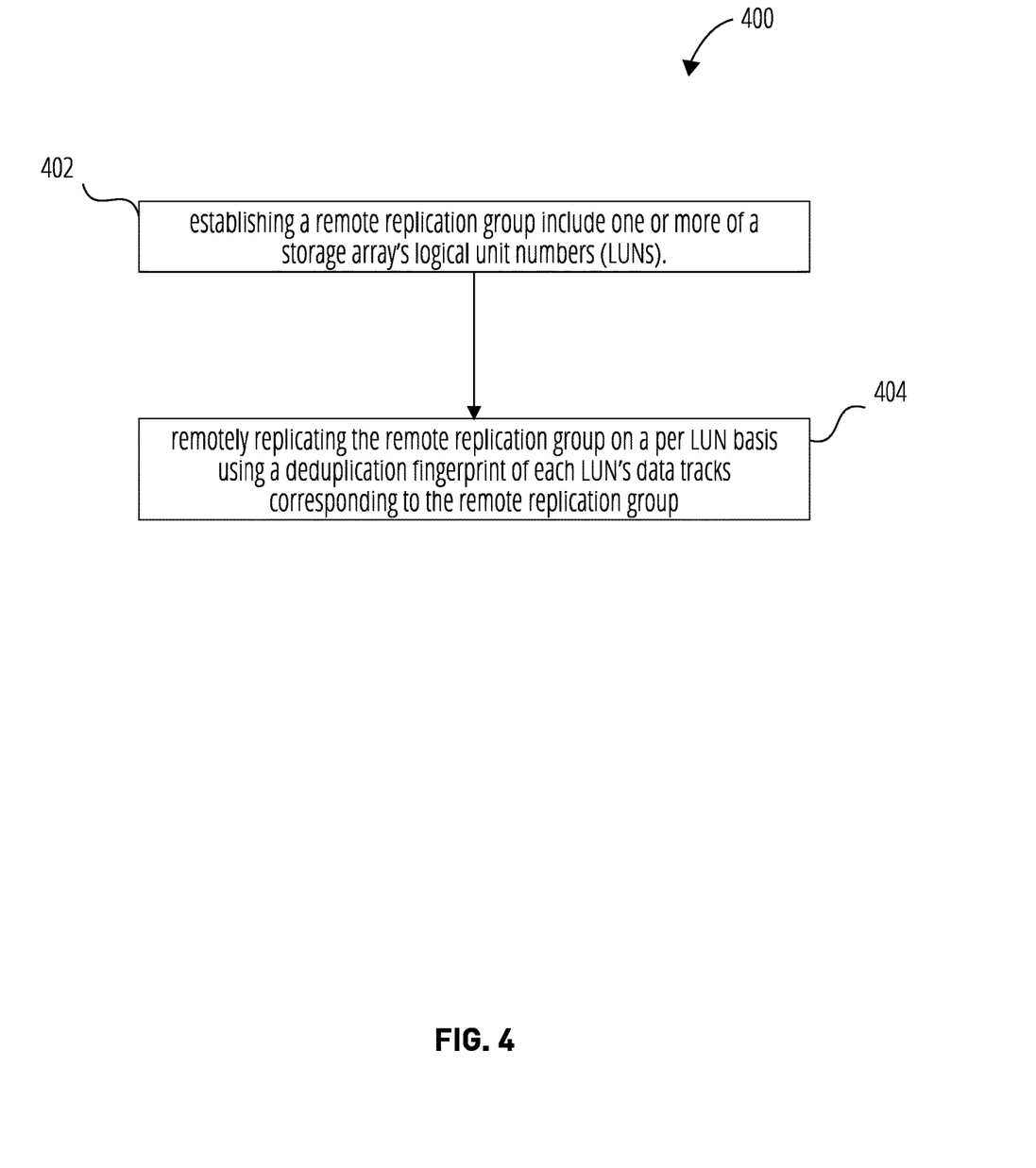
FIG. 4 is a flow diagram of a method that includes remotely replicating data in accordance with embodiments of the present disclosure.

Regarding FIG. 4, a method 400 depicts a sequence of operations for remotely replicating data from a storage array to a remote system. In embodiments, the method 400, at 402, can include establishing a remote replication group, including one or more of a storage array's logical unit numbers (LUNs). For example, the IO processor 302 of FIG. 3 can establish a remote replication group includes one or more of a storage array's logical unit numbers (LUNs). Further, at 404, method 400, can include remotely replicating the remote replication group on a per LUN basis using a deduplication fingerprint of each LUN's data tracks corresponding to the remote replication group at a remote system. For example, the remote system controller 308 of FIG. 3 can remotely replicate the remote replication group at a LUN level using a deduplication fingerprint of each LUN's data tracks corresponding to the remote replication group.

Figure 5:
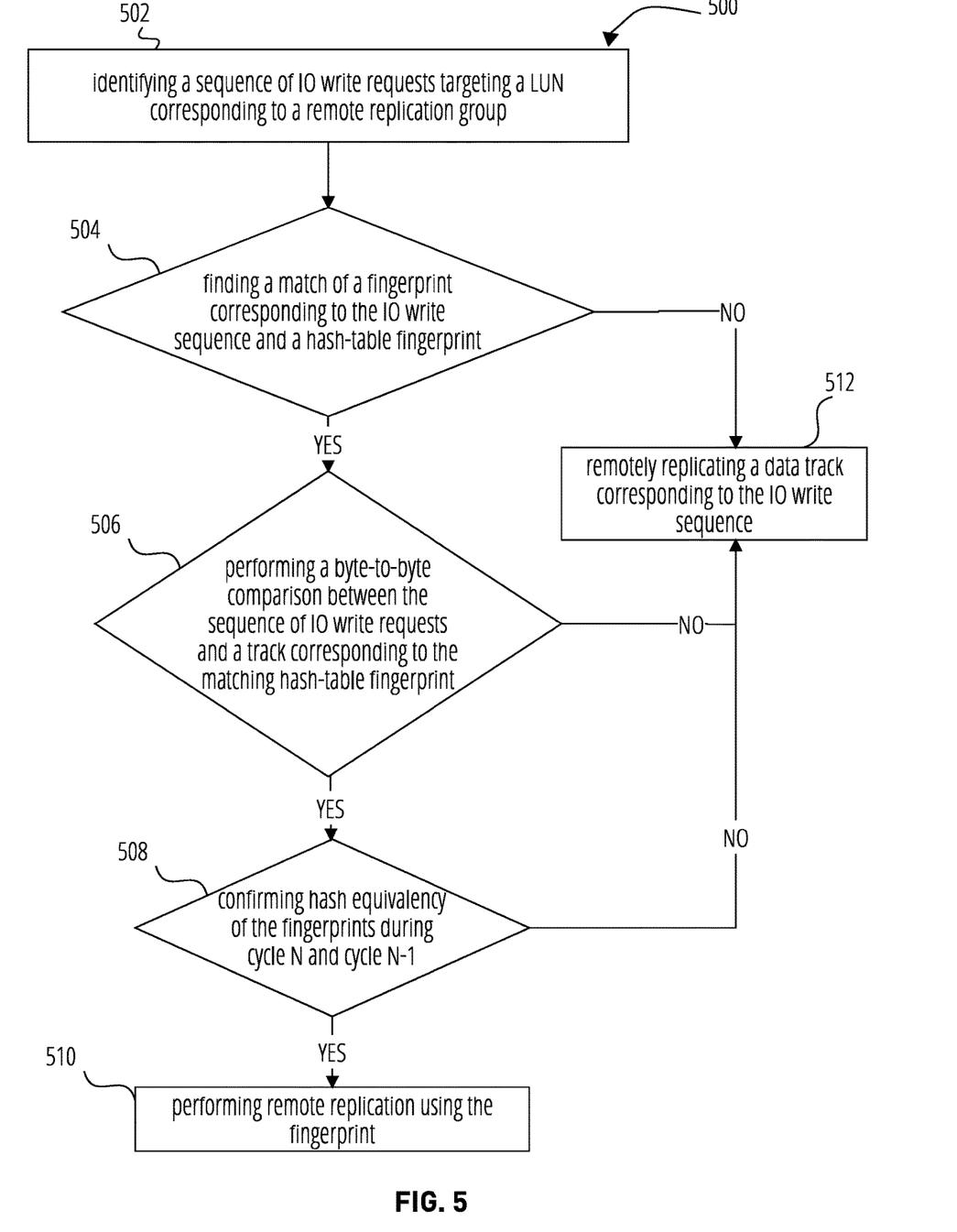
FIG. 5 is a flow diagram of a method that includes reducing remote replication network bandwidth in accordance with embodiments of the present disclosure.

Regarding FIG. 5, a method 500 depicts a sequence of operations for reducing remote replication network bandwidth. In embodiments, the method 500, at 502, can include identifying a sequence of IO write requests targeting a LUN corresponding to a remote replication group at 502. For example, the RG deduplication processor 304 of FIG. 3 can identify a sequence of IO write requests targeting a LUN corresponding to a remote replication group. Further, if a match is found, at 502, the method 500, at 504, can include finding a match of a fingerprint corresponding to the IO write sequence and a hash-table fingerprint. For example, the RG deduplication processor 304 of FIG. 3 can find a match of a fingerprint corresponding to the IO write sequence and a hash-table fingerprint.

In addition, if a match is found, at 504, the method 500, at 506, can include performing a byte-to-byte comparison between the sequence of IO write requests and a track corresponding to the matching hash-table fingerprint. For example, the RG deduplication processor 304 of FIG. 3 can perform a byte-to-byte comparison between the sequence of IO write requests and a track corresponding to the matching hash-table fingerprint.

Further, if the comparison, at 506, results in a match, the method 500, at 508, can include confirming hash equivalency of the fingerprints during cycle n and cycle n−1. For example, the RG deduplication processor 304 of FIG. 3 can confirm the hash equivalency of the fingerprints during cycle n and cycle n−1. Additionally, if, at 508, the hashes are equivalent, the method 500, at 510, can include performing remote replication using the fingerprint. For example, the remote system controller 308 of FIG. 3 can perform remote replication using the fingerprint.

Lastly, if the method 500, at 504, 506, or 508, provides a negative result, the method 500, at 512, can include remotely replicating a full data track corresponding to the IO write sequence. For example, the remote system controller 308 of FIG. 3 can remotely replicate the full data track corresponding to the IO write sequence.

Figure 6:
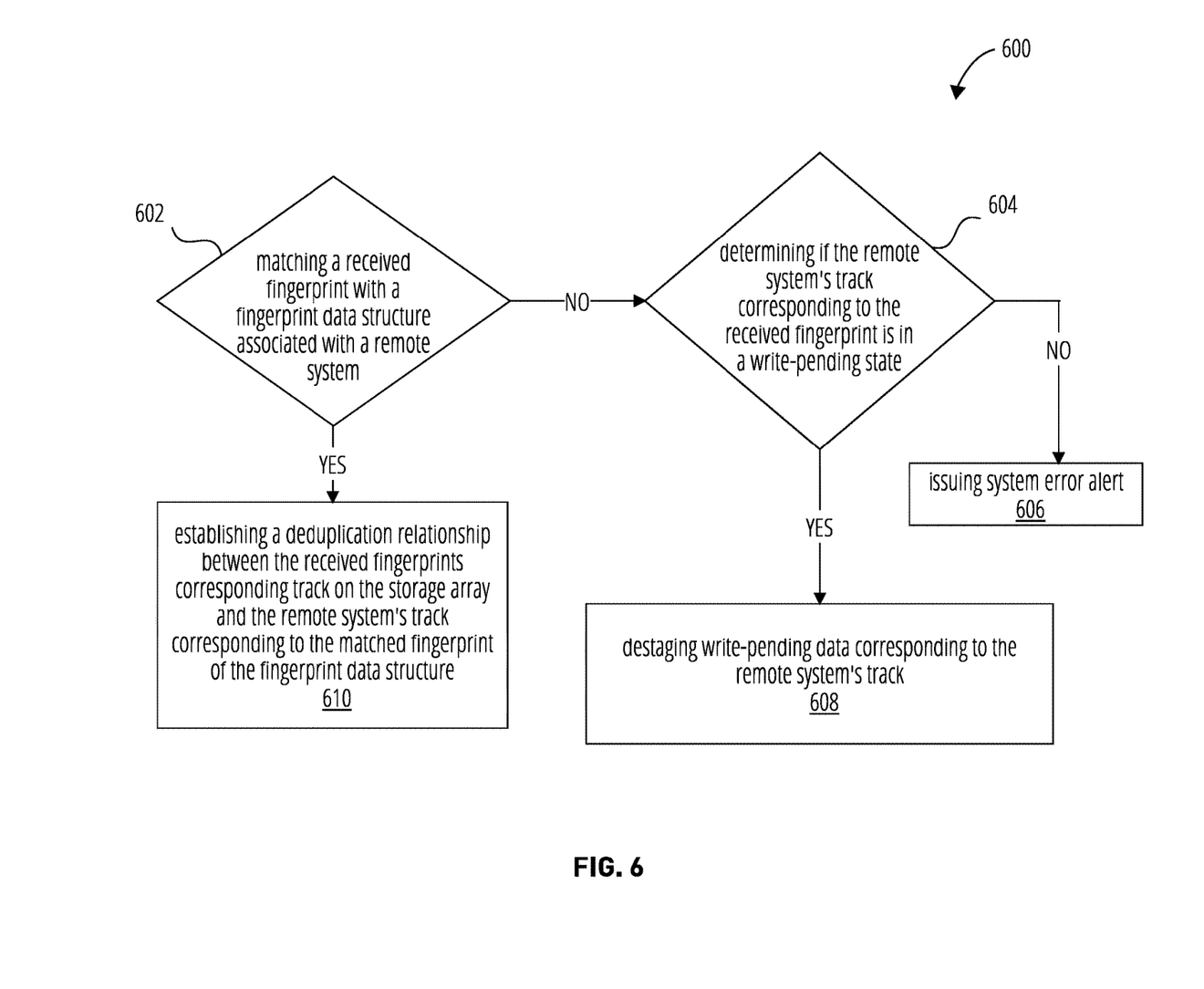
FIG. 6 is a flow diagram of a method that includes remotely replicating a storage array's data using a data fingerprint in accordance with embodiments of the present disclosure.

Regarding FIG. 6, a method 600 depicts a sequence of operations for remotely replicating a storage array's data using a data fingerprint at a remote system (e.g., remote system 138). In embodiments, the method 600, at 602, can include matching a received fingerprint with a fingerprint data structure associated with a remote system. For example, the replication controller 312 of FIG. 3 can match a received fingerprint with a fingerprint data structure associated with a remote system. If a match is not found, the method 600, at 604, can include determining if the remote system's track corresponding to the received fingerprint is write-pending. For example, the replication controller 312 of FIG. 3 can determine if the remote system's track corresponding to the received fingerprint is write-pending.

Further, if the track is not write-pending, the method 600, at 606, can include issuing a system error alert to the storage array 102 or an admin host (e.g., client machine 134b). For example, the replication controller 312 of FIG. 3 can issue a system error alert to the storage array 102 or an admin host. However, if the track is write-pending, the method 600, at 608, can include destaging write-pending data corresponding to the remote system's track. For example, the replication controller 312 of FIG. 3 can destage write-pending data corresponding to the remote system's track.

Additionally, if the method 600, at 602, found a match, the method 600, at 610, can include establishing a deduplication relationship between the received fingerprints corresponding track on the storage array and the remote system's track corresponding to the matched fingerprint of the fingerprint data structure. For example, the replication controller 312 of FIG. 3 can establish a deduplication relationship between the received fingerprints corresponding track on the storage array and the remote system's track corresponding to the matched fingerprint of the fingerprint data structure.

Further, each operation can include any combination of techniques implemented by the embodiments described herein. Additionally, one or more of the storage array's components 140 can implement one or more of the operations of each method described above.

Using the teachings disclosed herein, a skilled artisan can implement the above-described systems and techniques in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer having a display device that enables user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device can include, for example, a computer (e.g., desktop computer, laptop computer) with a world wide web browser (e.g., Microsoft® Internet Explorer® and Mozilla®). The mobile computing device can include, for example, a Blackberry®.

Comprise, include, or plural forms of each are open-ended, include the listed parts, and contain additional unlisted elements. Unless explicitly disclaimed, the term 'or' is open-ended and can include one or more of the listed parts, items, elements, and combinations thereof.

What is claimed is:

1. The method comprising:
   establishing a remote replication group including one or more logical unit numbers (LUNs) of a storage array; and
   remotely replicating the remote replication group on a per LUN basis using a deduplication fingerprint of each LUN's data tracks corresponding to the remote replication group at a remote system.

2. The method of claim 1, further comprising:
   receiving an input/output (IO) workload at the storage array, wherein the IO workload includes IO requests targeting at least one of the storage array's LUNs; and
   generating at least one corresponding deduplication fingerprint for each IO request in the IO workload.

3. The method of claim 1, further comprising:
   receiving the IO workload according to a capture cycle, N+m; and
   generating one or more cycle snaps of at least the remote replication group according to a cycle snap schedule.

4. The method of claim 1, further comprising:
   transmitting data corresponding to the remote replication group according to a transmit cycle, N to the remote system; and
   replicating LUN data on the remote system according to an apply cycle, N−1, wherein the LUN data corresponds to data received by the remote system during a previous transmit cycle.

5. The method of claim 4, further comprising:
   generating one or more cycle snaps of at least the remote replication group according to a cycle snap schedule, wherein the cycle snap schedule corresponds to the transmit cycle, apply cycle, or a statically/dynamically defined cycle.

6. The method of claim 4, further comprising:
   determining whether the remote array or server includes data duplicating the remote replication group's data during a period corresponding to a replication group cycle snap, wherein the replication group cycle snap corresponds to a time interval consistent with at least one of the transmit or apply cycles.

7. The method of claim 6, further comprising:
   identifying fingerprint matches by comparing each deduplication fingerprint corresponding to the remote replication group with the remote system's stored duplication fingerprints at a time corresponding to the replication group cycle snap.

8. The method of claim 7, further comprising:
   performing a byte-to-byte comparison for each identified fingerprint match's related storage array data track and remote system data track; and
   establish a deduplication relationship between the storage array data track and the remote system data track.

9. The method of claim 7, further comprising:
   determining whether each unmatched deduplication's related data track's corresponding to the remote system data track is in a write-pending (WP) state.

10. The method of claim 9, further comprising:
    destaging each unmatched deduplication's related data track on the remote system based on their corresponding to the remote system data track's WP state.

11. A system with a processor and memory, the system configured to:
    establish a remote replication group including one or more logical unit numbers (LUNs) of a storage array; and
    remotely replicate the remote replication group on a per LUN basis using a deduplication fingerprint of each LUN's data tracks corresponding to the remote replication group at a remote system.

12. The system of claim 11, further configured to:
    receive an input/output (IO) workload at the storage array, wherein the IO workload includes IO requests targeting at least one of the storage array's LUNs; and
    generate at least one corresponding deduplication fingerprint for each IO request in the IO workload.

13. The system of claim 11, further configured to:
    receive the IO workload according to a capture cycle, N+m; and
    generate one or more cycle snaps of at least the remote replication group according to a cycle snap schedule.

14. The system of claim 11, further configured to:
    transmit data corresponding to the remote replication group according to a transmit cycle, N to the remote system; and
    replicate LUN data on the remote system according to an apply cycle, N−1, wherein the LUN data corresponds to data received by the remote system during a previous transmit cycle.

15. The system of claim 14, further configured to:
    generate one or more cycle snaps of at least the remote replication group according to a cycle snap schedule, wherein the cycle snap schedule corresponds to the transmit cycle, apply cycle, or a statically/dynamically defined cycle.

16. The system of claim 14, further configured to:
    determine whether the remote array or server includes data duplicating the remote replication group's data during a period corresponding to a replication group cycle snap, wherein the replication group cycle snap corresponds to a time interval consistent with at least one of the transmit or apply cycles.

17. The system of claim 16, further configured to:
    identify fingerprint matches by comparing each deduplication fingerprint corresponding to the remote replication group with the remote system's stored duplication fingerprints at a time corresponding to the replication group cycle snap.

18. The system of claim 17, further configured to:
    perform a byte-to-byte comparison for each identified fingerprint match's related storage array data track and remote system data track; and
    establish a deduplication relationship between the storage array data track and the remote system data track.

19. The system of claim 17, further configured to:
determine whether each unmatched deduplication's related data track's corresponding to the remote system data track is in a write-pending (WP) state.

20. The system of claim 19, further configured to:
destage each unmatched deduplication's related data track on the remote system based on their corresponding to the remote system data track's WP state.

\* \* \* \* \*